US006668315B1

United States Patent
Safford et al.

(10) Patent No.: US 6,668,315 B1
(45) Date of Patent: Dec. 23, 2003

(54) METHODS AND APPARATUS FOR EXCHANGING THE CONTENTS OF REGISTERS

(75) Inventors: Kevin David Safford, Fort Collins, CO (US); Patrick Knebel, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/449,804

(22) Filed: Nov. 26, 1999

(51) Int. Cl.$^7$ .................. G06F 9/455; G06F 15/00; G06F 9/30; G06F 9/40; G06F 7/38
(52) U.S. Cl. .............. 712/219; 712/222; 712/225; 703/26
(58) Field of Search .............. 703/26; 712/222, 712/219, 225

(56) References Cited

U.S. PATENT DOCUMENTS

| | | | |
|---|---|---|---|
| 5,404,469 A | * 4/1995 | Chung et al. | 711/119 |
| 5,471,593 A | * 11/1995 | Branigin | 712/219 |
| 5,522,051 A | * 5/1996 | Sharangpani | 711/200 |
| 5,572,664 A | * 11/1996 | Bujanos | 714/25 |
| 5,649,225 A | * 7/1997 | White et al. | 712/1 |
| 5,696,955 A | * 12/1997 | Goddard et al. | 712/222 |
| 5,764,938 A | * 6/1998 | White et al. | 712/200 |
| 5,819,060 A | 10/1998 | Cesana | |
| 5,857,089 A | * 1/1999 | Goddard et al. | 712/222 |
| 5,859,999 A | 1/1999 | Morris et al. | 395/565 |
| 5,860,017 A | 1/1999 | Sharangpani et al. | 395/600.23 |
| 5,884,062 A | * 3/1999 | Wichman et al. | 712/218 |
| 5,930,508 A | * 7/1999 | Faraboschi et al. | 712/204 |
| 5,940,311 A | * 8/1999 | Dao et al. | 708/204 |
| 5,991,863 A | * 11/1999 | Dao et al. | 708/708 |
| 6,079,011 A | * 6/2000 | Song | 712/214 |
| 6,370,637 B1 | * 4/2002 | Meier et al. | 709/104 |

OTHER PUBLICATIONS

Microsoft Press Computer Dictionary, Second Edition, p.90. Copyright 1994.*
Intel "Pentium® Processor for Embedded Applications". Chap. 31. Dec. 1998. http://www.intel.com/design/intarch/technifo/pentium/specupdt/ppsu1.htm.*
Alexander Wolfe, "Techniques of predication and speculation detailed", Electronic Engineering Times, Feb. 1999.

* cited by examiner

Primary Examiner—Kevin J. Teska
Assistant Examiner—Ayal I. Sharon

(57) ABSTRACT

A processor based computer system having dependency checking logic and a register stack, wherein the system overrides the dependency logic such that move instructions associated with the stack registers may be executed in parallel. The system operates such that it can be determined whether a stack underflow exception has occurred and if it has, the move instructions can be flushed, and a micro-code handler algorithm invoked that operates to allow execution of the move instructions in parallel without a stack underflow exception.

14 Claims, 4 Drawing Sheets

METHODS AND APPARATUS FOR EXCHANGING THE CONTENTS OF REGISTERS

I. FIELD

The present invention relates to digital computer systems, and more particularly, but not by way of limitation, to methods and apparatus for executing instructions in such systems.

II. BACKGROUND

In x86 computer systems, the floating point unit (FPU) comprises a plurality of data registers. Floating point instructions treat this plurality of data registers as a register stack. All addressing of the data registers is relative to the register on the top of the stack. The register number of the current top-of-stack register is stored in a stack TOP field. Thus, load operations decrement TOP by one and load a value into the new top-of-stack register, while store operations store the value from the current top-of-stack register in memory and then increment TOP by one.

Many floating point instructions, however, only operate on the top one or two registers of a register stack. Thus, if the desired information is located in, e.g., the fourth stack register, one or more operations must be performed before the information in the fourth stack register can be moved into the top register of the stack where it can be operated upon. This creates a "bottleneck" in the stack. To this end, the floating point exchange register contents instruction (FXCH) is used in the IA-32 computer architecture to exchange the floating point information in a selected stack register with that in the top register of the stack. For example, the instruction FXCH ST(0), ST(i)

will exchange the information in the top register in the stack (denoted ST(0)) with the ith register in the stack (denoted ST(i)). In this way, the bottleneck in the register stack can be alleviated by putting desired information at the top of the stack, where it can then be operated upon by most floating point instructions. More information regarding the FXCH instruction may be found in the *Intel Architecture Software Developer's Manual, Volumes* 1–3, which are hereby incorporated by reference.

In many computer architectures, instructions, such as the FXCH, must be executed by emulation because the native hardware that supports such an instruction is not present. One way of emulating the FXCH instruction in such architectures is through a technique called register renaming. In register renaming, the physical registers in question (e.g., ST(0) and ST(i)) are mapped into a stack register map. To exchange the contents of the two physical registers, the pointers that map the physical registers into the stack register map are changed or "re-pointed" from their original register to the other register, and thus the operation is performed. But, at least one problem with register renaming is that it requires that the pointers be stored in additional hardware which adds to the cost and complexity of the system as well as consuming valuable space.

Another way of emulating the FXCH is to sequentially execute at least three micro-code instructions as follows:

move temp:=ST(0);
move ST(0):=ST(i);
move ST(i):=temp;

This is the traditional method of exchanging the contents of the register. This sequence of instructions uses a temporary register to switch the contents of the top register ST(0) and the ith register ST(i). This method of emulation, with its three micro-code instructions, consumes three times as many clock cycles as the single FXCH instruction and, in some cases, may consume even more, depending upon the latency associated with the move operations. Thus, there exists a need for methods and apparatus for emulating the FXCH instruction without adding excess hardware and that consumes relatively few clock cycles. More generally, there exists a need for methods and apparatus for exchanging the contents of two registers in a relatively quick and efficient manner.

III. SUMMARY

In one embodiment of the present invention, there is a processor based computer system having dependency checking logic and a register stack, wherein the system overrides the dependency logic such that move instructions associated with the stack registers may be executed in parallel. In another embodiment, the system operates such that it can be determined whether a stack underflow exception has occurred and if it has, the move instructions can be flushed, and a micro-code handler algorithm invoked that operates to allow execution of the move instructions in parallel without a stack underflow exception.

IV. BRIEF DESCRIPTION OF THE DRAWINGS

V. DETAILED DESCRIPTION

A. Description of an Embodiment

Figure 1:
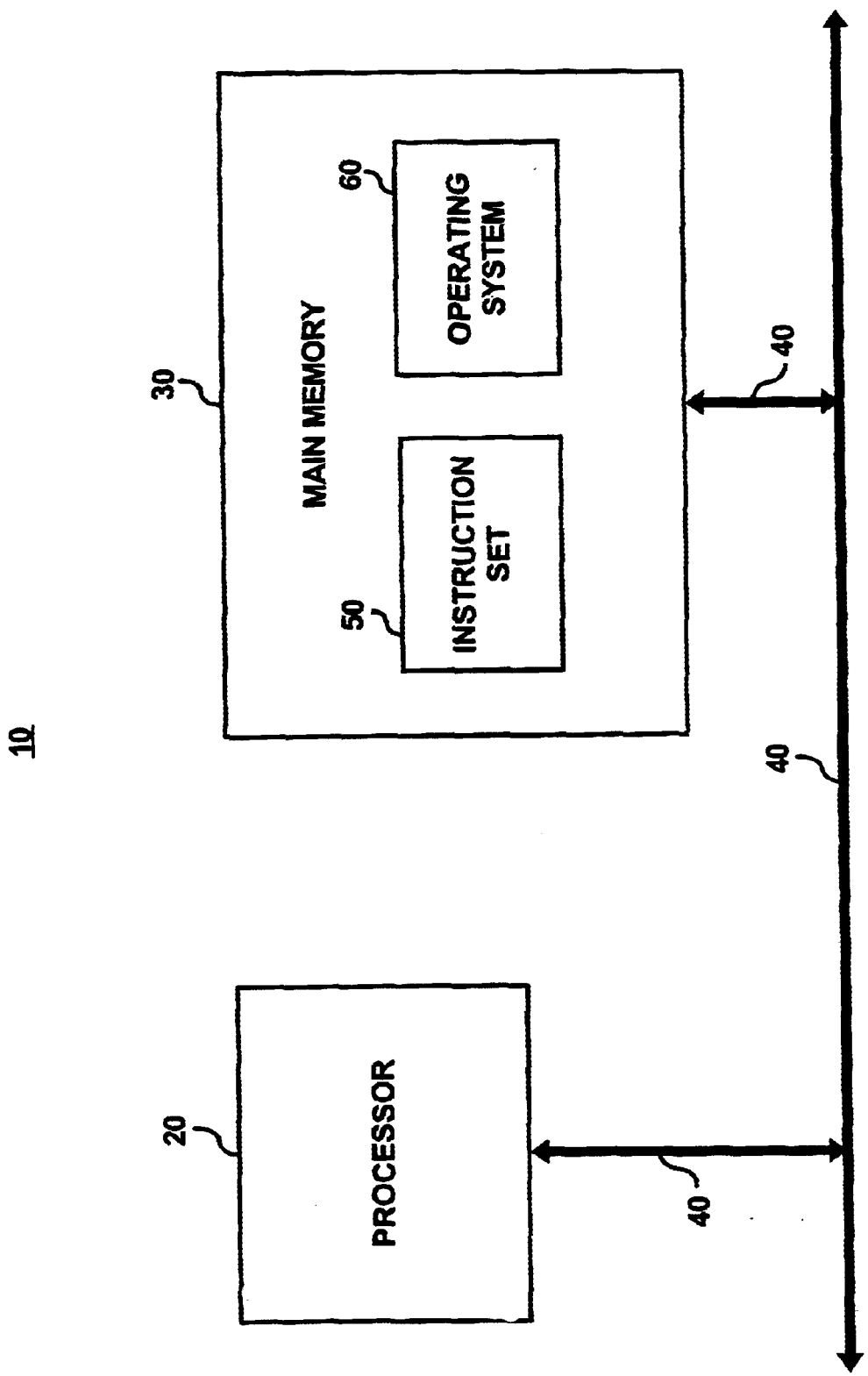
FIG. 1 is a block diagram of a computer system including the present invention.
Figure 2:
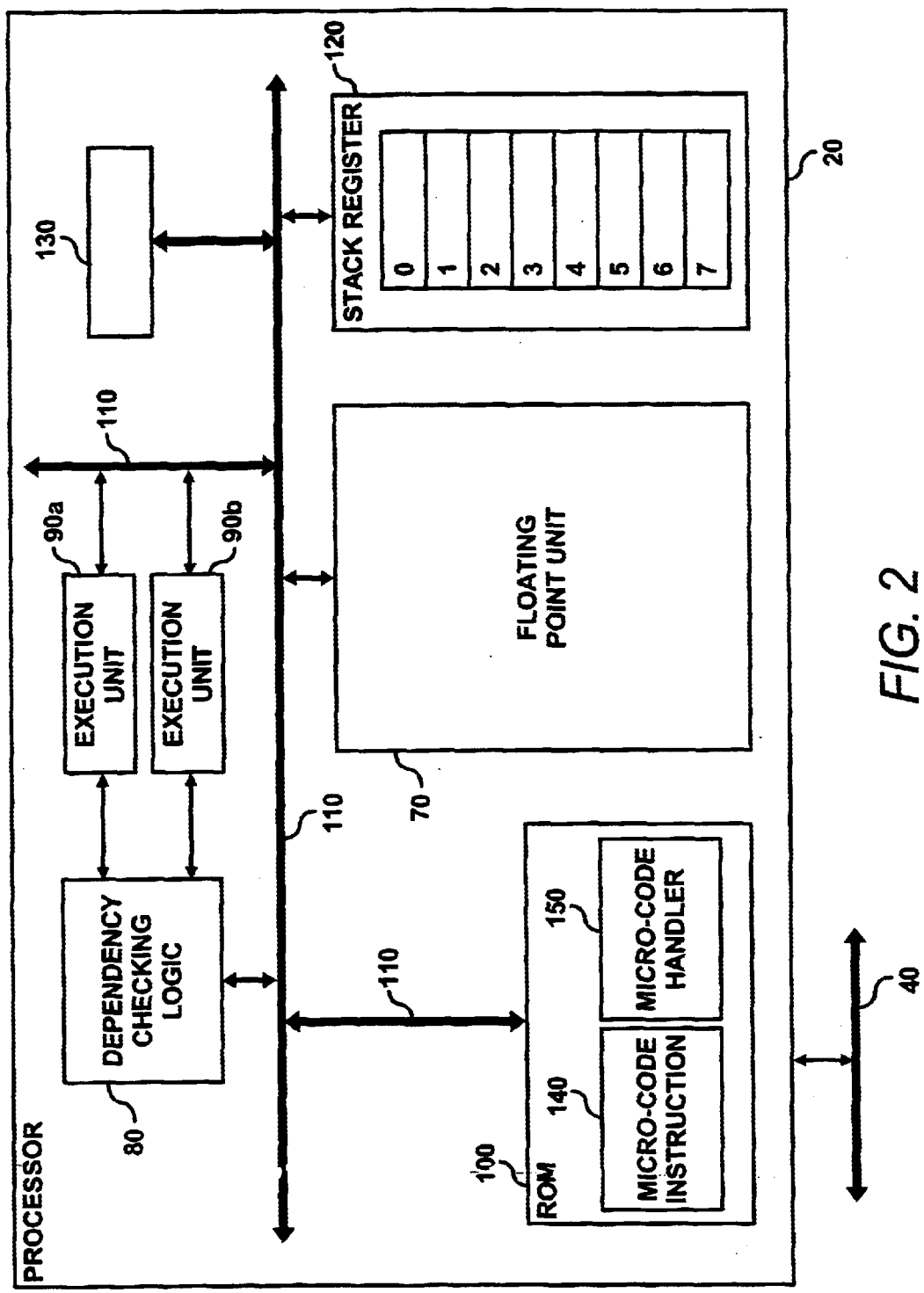
FIG. 2 is block diagram of the processor of FIG. 1.

FIG. 1 illustrates a computer system 10 in which the present invention may be implemented. The computer system 10 comprises at least one processor 20, main memory 30, and various interconnecting data, address, and control busses (numbered collectively as 40). An instruction set 50 (which may be a guest instruction set) and an operating system 60 may be stored in main memory 30. As illustrated in FIG. 2, the processor 20 comprises a floating point unit 70, dispatch or dependency checking logic 80, at least two execution units 90a and 90b, micro-code ROM 100, a register stack 120 (in this embodiment the register stack 120 comprises eight individual registers 120(0)–(7)), a floating point tag word (FPTW) register 130, and various busses and interconnections (numbered collectively as 110). (One skilled in the relevant art will note that there need not be a separate floating point unit—the execution units are equally capable of executing floating point instructions).

Instructions are provided to the processor 20 from main memory 30. The instructions provided to the processor 20 are macro-code instructions that map to one or more micro-code instructions 140 stored in the micro-code ROM 100. The micro-code instructions can be directly executed by processor 20. Also stored in the micro-code ROM 100 are a set of micro-code handlers 150 that may be invoked to handle processor exceptions.

The floating point unit 70 accesses the register stack 120 to store and retrieve data in response to instructions. The FPTW register 130 is updated accordingly.

The processor 20 may have a pipelined architecture and may have allow for parallel processing of certain instructions. Dependency checking logic 80 operates to determine which instructions can be operated in parallel, i.e., whether to issue two instructions or one instruction per cycle to the execution units 90.

B. Method of Operation

1. Parallel Execution of Move Instructions

Assume that the processor 20 is presented with the following instructions:

ST(i):=move ST(0);
ST(0):=move ST(i);

In a sequential microprocessor, this sequence of code is not capable of exchanging the contents of the two registers (ST(0) and ST(i). In a sequential microprocessor, each instruction is executed independently and in serial fashion. Thus, in this sequence the first instruction will overwrite ST(i) before the second instruction reads ST(i), and the result placed in ST(0) will be ST(0) rather than ST(i). This is obviously an incorrect result. As noted, the traditional method for correctly performing the desired exchange would require an additional temporary location and an extra instruction.

However, in the present invention, the computer system 10 emulates the FXCH instruction by forcing the two move instructions to be executed in parallel (illustrated conceptually below):

| ST(i): = move ST(0); | ST(0): = move ST(i); |
|---|---|

Figure 3:
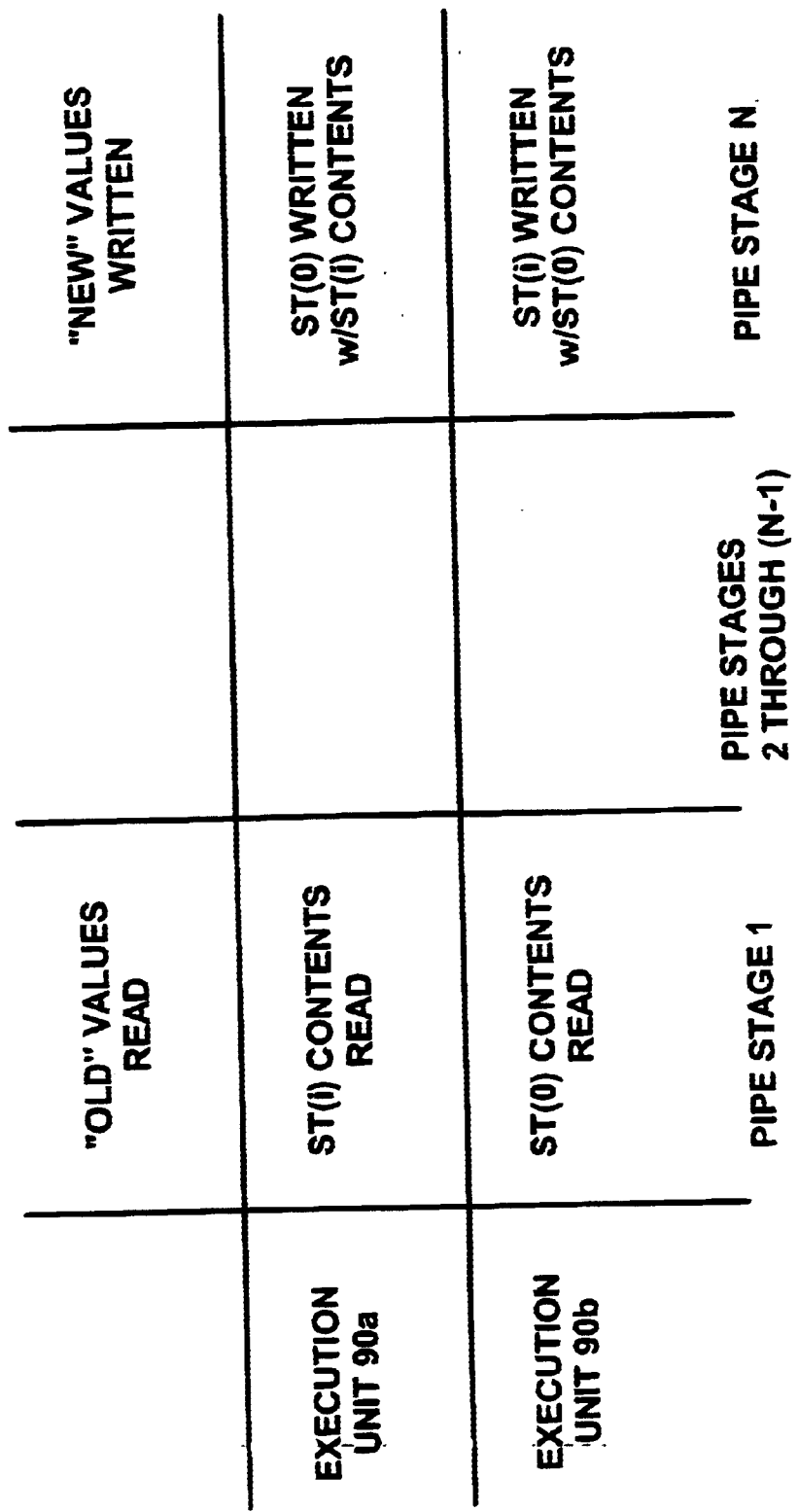
FIG. 3 is an illustration of pipelined or lockstep operations.

Because these two instructions each modify a register used by the other instruction, hardware would normally inhibit them from being executed in parallel. Thus, in the present invention, a mechanism is provided that forces the hardware to override the dependency checking logic, and forces the hardware to execute the two instructions in parallel. Both instructions are provided to respective execution units 90*a* and 90*b* that (1) read their respective operand at substantially the same time, (2) write their results at substantially the same time (at least one clock cycle after the read), and (3) finish executing their instructions at substantially the same time (i.e., they operate in lockstep). The latency associated with the respective execution units 90*a* and 90*b* is such that this can be accomplished. This lockstep execution is illustrated conceptually in FIG. 3. In this manner, the computer system 10 can effectively emulate the FXCH instruction in substantially less time than it would take to execute the three move instructions of a sequential system.

2. Stack Underflow Exception

In modern superscalar microprocessors (ones with the ability to execute multiple instructions in parallel) exceptions are precise, meaning that when an operation faults, all of the "younger" operations in the pipeline must be flushed. However, in the present invention, a temporary register is not used to hold intermediate results of operations in the pipeline—i.e., the two instructions are completed in lockstep. Thus, if either one of the two move instructions above causes an exception, both of the move instructions are flushed and re-executed in parallel to prevent data corruption. However, that is not conventional operation for many microprocessors. That type of operation will work properly if the "first" instruction causes the exception, but not if the "second" instruction does—in that case, conventional operation dictates that the "first" instruction would not be flushed (see example below):

| ST(i) := mov ST(0) | ST(0) := mov ST(i) |
|---|---|
| "first" | "second" |
| "older" | "younger" |

Thus, in the present invention, the computer system 10 flushes both operations when either of them causes a fault.

An exception that may occur when these move instructions are executed is called a "stack underflow" exception. A stack underflow exception occurs when an operation attempts to read the contents of an empty stack register 120(0)–(7). A floating point tag word stored in the FPTW register 130 indicates whether a stack register 120(0)–(7) is empty or not. A defined architectural response to a stack underflow is to replace the empty register with a QNaN, mark it as non-empty, and the perform the instruction again. While it is possible to add hardware inside the execution units 90*a* and 90*b* to indicate which of the two move instruction caused the stack underflow fault, that is not desired because of the additional complexity and cost.

Figure 4:
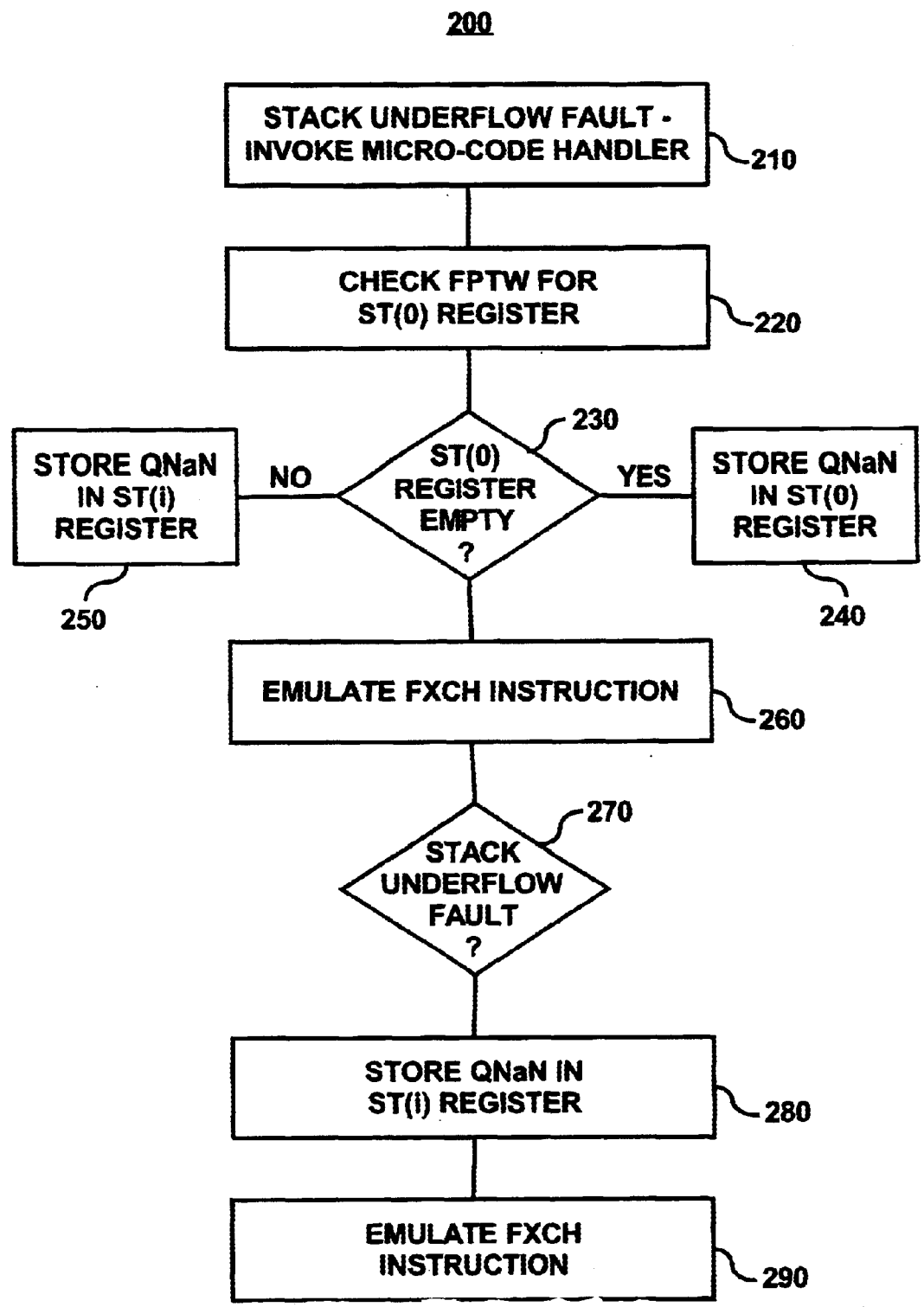
FIG. 4 is a flow chart of the operation of the stack underflow fault micro-code handler of the present invention.

Thus, in the computer system 10, a micro-code handler algorithm 200, such as that illustrated in FIG. 4, is invoked by processor 20 when a stack underflow exception occurs. At block 210 of FIG. 4, a stack underflow exception has occurred when an attempt to execute the two move operations in parallel was attempted. At block 220, the micro-code handler algorithm 200 causes the FPTW bits in the FPTW register 130 that correspond to the ST(0) register to be checked and then at block 230, a decision is made as to whether register ST(0) is empty or not. If register ST(0) is empty, at block 240 its contents are replaced with a QNaN and the corresponding FPTW bit is set to indicate that the ST(0) register is no longer empty. Proceeding now to block 260, emulation of the FXCH instruction is performed again (by issuing the two instructions in parallel again). If the register ST(0b) was not empty, the exception must have occurred because register ST(i) was empty and, at block 250 the register ST(i) contents are replaced with a QnaN, the corresponding FPTW bit is set, and the emulation is performed again at block 260. At block 270, if a stack underflow exception occurs once again, it is known that both registers involved in the operation must have been empty originally and that this time, the ST(i) register caused the exception. The registers contents at this stage are:

| ST(0) := QNaN | ST(i) := empty |
|---|---|

Accordingly, at block 280, the ST(i) register is loaded with a QNaN and at block 290, the emulation proceeds again, this time without any exceptions—the QNaNs in the two registers will be harmlessly exchanged.

C. Remarks

By "forcing" the two move instructions to execute in parallel, emulation of the FXCH instruction may be achieved in substantially less time than previous methods and without adding hardware to the computer system 10. Furthermore, a microcode handler ensures correct execution of the emulated FXCH in the event of a stack underflow exception.

It will be readily apparent to those skilled in the art that innumerable variations, modifications, applications, and extensions of these embodiments and principles can be made without departing from the principles and spirit of the invention. For example, the methods and apparatus described herein may be applied to emulation of other instructions and to the handling of exceptions that occur when they are executed.

In another embodiment, rather than re-executing the instruction with respect to the ST(i) register (at block 260 of FIG. 4), the computer system 10 instead checks the ST(i) register thereby eliminating the need to re-execute an instruction. In this embodiment, additional hardware or microcode is added to determine which register ST(i) is referenced in the instruction. Accordingly, it is intended that the scope of the invention be only limited as necessitated by the accompanying claims.

What is claimed is:

1. A method for switching the contents of a top stack register and a selected stack register containing floating point data, comprising:

overriding the dependency of the top stack register and the selected stack register, wherein the top stack register and the selected stack register are registers in a floating point stack;

moving floating point data of the top stack register into the selected stack register to execute a first instruction; and moving floating point data of the selected stack register into the top stack register to execute a second instruction in parallel with moving the floating point data of the top stack register into the selected stack register.

2. The method of claim 1 further comprising:

determining whether the top register is empty if a stack underflow exception occurs on a first attempt to execute the first and second instructions, and if the top register is empty, replacing its contents with a QNaN, and if the top register is not empty, replacing the contents of the selected register with a QNaN.

3. The method of claim 2 further comprising:

replacing the contents of the selected register with a QNaN if the top register is empty on the first attempt to execute the first and second instructions and if a stack underflow exception occurs on a second attempt to execute the first and second instructions.

4. A method of executing move instructions, comprising:

providing a processor with a move ST(0) instruction and a move ST(i) instruction, wherein ST(0) denotes the top stack register of a stack and ST(i) denotes the $i^{th}$ register of the stack;

overriding the sequential dependency of the ST(0) and ST(i) registers;

executing the move ST(0) and move ST(i) instructions in parallel by providing the move ST(0) instruction and the move ST(i) instruction to parallel execution units such that the ST(0) and ST(i) instructions are executed substantially at the same time.

5. The method of claim 4, further comprising:

flushing the move ST(0) instruction and the move ST(i) instruction if a stack underflow exception occurs when the instructions are executed in parallel; and invoking an algorithm that determines whether the stack underflow exception occurred because the ST(0) register, ST(i) register, or both were empty.

6. The method of claim 5, wherein the algorithm replaces an empty stack register with the defined architectural response.

7. The method of claim 6, wherein the algorithm replaces the ST(i) register with the defined architectural response if a stack underflow exception occurs the first time the move instructions are executed and the ST(0) register is not empty.

8. The method of claim 7, wherein the algorithm replaces the ST(i) register with the defined architectural response if a stack underflow exception occurs and the contents of the ST(0) register have been replaced with the defined architectural response.

9. The method of claim 1, wherein moving the contents of the top stack register into the selected stack register and moving the contents of the selected stack register into the top stack register further comprises:

reading operands from the top stack register and the selected stack register at substantially the same time;

writing results to the top stack register and the selected stack register at substantially the same time; and finishing executing the first and second instructions at substantially the same time.

10. The method of claim 1, wherein moving the contents of the top stack register into the selected stack register and moving the contents of the selected stack register into the top stack register further comprises:

providing the first instruction to a first execution unit and the second instruction to a second execution unit such that the first and second instructions are executed in parallel by the first and second execution units.

11. The method of claim 4, wherein ST(0) denotes the top stack register of a floating point stack and ST(i) denotes the $i^{th}$ register of the floating point stack.

12. An apparatus comprising:

means for overriding a dependency of a top stack register and a selected stack register, wherein the top stack register and the selected stack register are registers in a floating point stack;

means for moving floating point data of the top stack register into the selected stack register to execute a first instruction; and means for moving floating point data of the selected stack register into the top stack register to execute a second instruction in parallel with moving the floating point data of the top stack register into the selected stack register.

13. The apparatus of claim 12, further comprising:

means for determining whether the top stack register is empty if a stack underflow exception occurs on a first attempt to execute the first and second instructions; and means for replacing the top stack register with a QNaN if the top register is empty and for replacing the contents of the selected register with a QNaN if the top register is not empty.

14. The apparatus of claim 12, wherein the means for replacing the top stack register comprises means for replacing contents of the selected register with a QNaN if the top register is empty in the first attempt to execute the first and second instructions and if a stack underflow exception occurs on a second attempt to execute the first and second instructions.

* * * * *

UNITED STATES PATENT AND TRADEMARK OFFICE
CERTIFICATE OF CORRECTION

PATENT NO. : 6,668,315 B1 Page 1 of 1
DATED : December 23, 2003
INVENTOR(S) : Kevin D. Safford et al.

It is certified that error appears in the above-identified patent and that said Letters Patent is hereby corrected as shown below:

Column 3,
Line 2, after "may" delete "have"

Column 4,
Line 39, delete "ST(0b)" and insert therefor -- ST(0) --

Signed and Sealed this

Third Day of May, 2005

JON W. DUDAS
*Director of the United States Patent and Trademark Office*